Patented June 15, 1943

2,321,673

UNITED STATES PATENT OFFICE 2,321,673

YEAST FOOD

Lloyd A. Hall, Chicago, Ill., assignor to The Griffith Laboratories, Inc., Chicago, Ill., a corporation of Illinois No Drawing. Application October 11, 1941, Serial No. 414,612

11 Claims. (Cl. 99—91)

The present invention relates to yeast foods in the form of a composition additive to commercial bread dough batches.

Yeast foods or stimulants are used in modern bakeries to control the time and character of the fermentation. Variations in seasons, conditions, materials, and other factors, may change in particular the time of fermentation. Since it is important that a time schedule be met, there is a well established practice of controlling the fermentation by varying the quantity of yeast food employed.

In carrying out this particular purpose of using yeast food, it is most essential that the yeast food on hand be stable against change, whereby one may depend upon a given weight of it having a given effect. Heretofore, it has been recognized that certain yeast foods containing bromates or iodates of various metals distintegrate rapidly. In disintegration an acid condition develops and the iodine or bromine constituent thereof is lost from the mass by volatilization of resulting products. The original product is normally white, but it soon discolors to a dark straw color which persists until the iodine or bromine constituent is gone, when it again becomes white. Containers such as cloth bags and paper cartons and liners are even eaten away during this period of deterioration.

Heretofore, such products have been stabilized by the use of small amounts of an alkali, such as calcium or magnesium carbonate, in spite of a recognition that considerable amounts of such alkali retard fermentation.

The present invention aims to produce stable yeast food without the necessity of using any stabilizer which is active or detrimental in the fermentation process.

A particular object of the invention is to use an oleaginous ingredient as a stabilizer for a yeast food.

A further object of the invention is to limit the oleaginous stabilizer in amount by associating it intimately with a limited number of the ingredients, with which it is effective.

In the type of yeast food to which the present invention applies, iodates or bromates of ammonium, sodium, potassium, calcium, magnesium, or other metal are employed together with a quantity of ammonium chloride. It is also customary to have a considerable quantity of calcium sulfate, of sodium chloride, and of a starch or flour as a diluent. It is such a composition which deteriorates readily. The initiation of deterioration has been ascribed to the presence of moisture in the flour and otherwise in the mass, as from the presence of sodium chloride, which with its commercial impurities is hygroscopic to an appreciable degree. Also the deterioration has been ascribed to small amounts of acid, without however, indicating the source of such acid. It is the combination of moisture and acid which appears to induce deterioration of the bromate or iodate ingredient.

According to the present invention I compound together those ingredients which contain or lead to moisture, and which may give rise to acidity. Thus, I compound together the flour, the sodium chloride and the ammonium chloride, and treat this compound so that it will be effectively insulated from the iodate or bromate salt when the final mixture is complete. To effect this purpose, the above mentioned damaging ingredients are well mixed with an oleaginous ingredient whereby they become coated with a fat or oil, to serve as an insulator between the so-coated particles and the particles of iodate or bromate subject to the damage.

While it is to be appreciated that I may make an original mixture of all the ingredients, and then treat the particles of it with an oleaginous agent, it will be understood that so many inert particles will thus be covered, that the mixture will be unnecessarily rich in the oleaginous agent. Thus, where a large amount of calcium sulfate is present in the mixture, since it is inert, there is no need to treat it with an oleaginous ingredient. Likewise, there is no need to treat the iodate or bromate salt with the oleaginous agent, where the damaging ingredients are so treated. On a theoretical basis it would seem possible to coat only the bromate or iodate salt, to protect it, and then mix in the other ingredients. But actually, the present invention contemplates not only protecting the bromate or iodate salt from moisture and acid, but also the minimizing of acidity formation and the effects of moisture. To these ends, the use of fat is preferably limited to those ingredients which have or absorb moisture and those chemicals which give rise to acidity, such as ammonium chloride.

Therefore in carrying out the invention in the preferred economical way to produce the particular composition given below, I first mix together the formula ingredients: ammonium chloride, sodium chloride, and flour. The flour may be wheat flour, corn flour, or other starchy flour, in natural grain form, or processed, as in the case of the disrupted grains of gelatinized corn starch. When these are mixed, to the mixer there is added the oleaginous agent of the formula in a liquid form, preferably by spraying it into the mixer. If the fat is a solid one, it is melted. However, an oil such as a liquid hydrogenated cotton-seed oil is preferred. These ingredients are thoroughly mixed with the oil, which becomes associated with the particles in such a way as to minimize the undesired reactions which otherwise would occur under storage conditions.

To this fatted mixture is added the potassium bromate of the formula, preferably previously diluted and distended by having been mixed with a portion of the inert calcium sulfate of the formula. For example, about 1 part of potassium bromate is compounded with about 4 parts of calcium sulfate, and the compound mixed into the fatted mixture. The resulting compound may be further reduced to the ultimate desired formula by adding the remainder of inert ingredients, in the case given, this being 480 parts of calcium sulfate.

The following formula illustrates:

| | Parts by weight |
|---|---|
| Potassium bromate | 6.63 |
| Ammonium chloride * | 200 |
| Sodium chloride * | 128 |
| Flour * | 133 |
| Liquid fat or oil * | 25 |
| Calcium sulfate | 506.5 |
| | 999.13 |

\* Compounded together without other ingredients.

From the foregoing it will be seen that the given yeast food has about 0.6% of potassium bromate. It is thus very important that this be preserved, if the effectiveness of control processes in a bakery is to be maintained.

By using the fat upon constituents excluding the potassium bromate, it is assured that several reactive particles such as ammonium chloride, starch and potassium bromate, are not housed together in an envelope of fat. By excluding the calcium sulfate from the fatting process, the usage of fat or oil is maintained at a lower level for suitable effectiveness.

From the foregoing, it will be understood that the amount of fat used in the above formula and procedure is low and near the minimum and that additional amounts may be present in the composition. The actual amount for effectiveness will depend upon the particular ingredients which are present when the fat is applied. It is also pointed out that in the above formula if the calcium sulfate had been present in the mixture being fatted, the amount of oil or fat required for a like effectiveness would be increased, owing to the waste by distribution over inert particles. Furthermore the character of the ingredients and the particle size are of great importance in determining the minimum usage of oil or fat.

As given, the commercial materials and the granulation commonly encountered in yeast foods have been employed, and the 2.5% of fat in the formula is somewhat above the minimum requirement for the materials used and the method of using them.

I have determined that the analysis of the above formulation at the end of 90 days' storage does not indicate any appreciable deterioration. Such a keeping yeast food is herein considered as "stable," and in actual practice the composition seldom is on hand for that period of time.

From the foregoing it will be appreciated the numerous variations in formula and methods of compounding are permitted without departure from the invention as expressed in the appended claims.

I claim:
1. The method of making a stable dry solid yeast food, which comprises mixing a flour, sodium chloride, ammonium chloride and a liquid oleaginous agent whereby to form a fat-surfaced particle mixture, and mixing with said mixture salt of the group consisting of iodates and bromates.

2. The method of making a stable dry solid yeast food, which comprises mixing a flour, sodium chloride, ammonium chloride and a liquid oleaginous agent whereby to form a fat-surfaced particle mixture, and mixing with said mixture salt of the group consisting of iodates and bromates, and inert content of the yeast food.

3. The method of making a stable dry solid yeast food, which comprises mixing a flour, sodium chloride, ammonium chloride and a liquid oleaginous agent whereby to form a fat-surfaced particle mixture, and mixing with said mixture salt of the group consisting of iodates and bromates, and calcium sulfate.

4. The method of making a yeast food in dry powder form which comprises mixing an oleaginous agent, particles of all the moisture-yielding ingredients of the yeast food, and all the particles of ammonium chloride of the yeast food whereby to form a mixture-forming mass of said particles with surfaces rendered fatty by said oleaginous agent, and mixing with said resulting mass all the remaining components of the yeast food said components consisting of uncoated particles of the ingredients of the yeast food which are inert in storage of the yeast food and of halogenate salt selected from the group consisting of iodates and bromates.

5. A yeast food in dry solid form which is stable against deterioration of halogenate salt contained therein, which comprises in particle form halogenate salt selected from the group consisting of iodates and bromates, ammonium chloride, and moisture-imparting content including in such content particles selected from the group consisting of starch and sodium chloride, said yeast food also comprising oleaginous material as coatings on the particles of said moisture-imparting ingredients and on the particles of said ammonium chloride, said coatings insulating all of the particles of said halogenate salt from direct contact with said moisture-imparting ingredients and with said ammonium chloride, the particles of said halogenate salt being uncoated.

6. A yeast food in dry solid form which is stable against deterioration of bromate salt contained therein, which comprises in particle form a bromate salt, ammonium chloride, and moisture-imparting ingredients including sodium chloride and starch, said yeast food also comprising oleaginous material as coatings on the particles of said moisture-imparting ingredients and on said ammonium chloride, said coatings insulating all of the particles of said bromate salt from direct contact with said moisture-imparting ingredients and with said ammonium chloride, the particles of said bromate salt being uncoated.

7. The product of claim 6 in which the bromate salt is potassium bromate.

8. A yeast food in dry solid form which is stable against deterioration of halogenate salt selected from the group consisting of iodate and bromate, which comprises in particle form halogenate salt selected from the group consisting of iodates and bromates, ammonium chloride, and moisture-imparting content, said yeast food also comprising oleaginous material as coatings on the particles of said moisture-imparting content and on the particles of said ammonium chloride, said coatings insulating all of the particles of said halogenate salt from direct contact with said moisture-imparting content and from contact with particles of said ammonium chloride, the particles of said halogenate salt being uncoated.

9. The product of claim 5 in which calcium sulfate is also a component of the mixture in uncoated particle form.

10. The product of claim 6 in which calcium sulfate is also a component of the mixture in uncoated particle form.

11. The product of claim 8 in which calcium sulfate is also a component of the mixture in uncoated particle form.

LLOYD A. HALL.